Feb. 28, 1950 — W. G. READ — 2,498,896
APPARATUS FOR IDENTIFYING MOBILE EQUIPMENT
Filed April 3, 1944
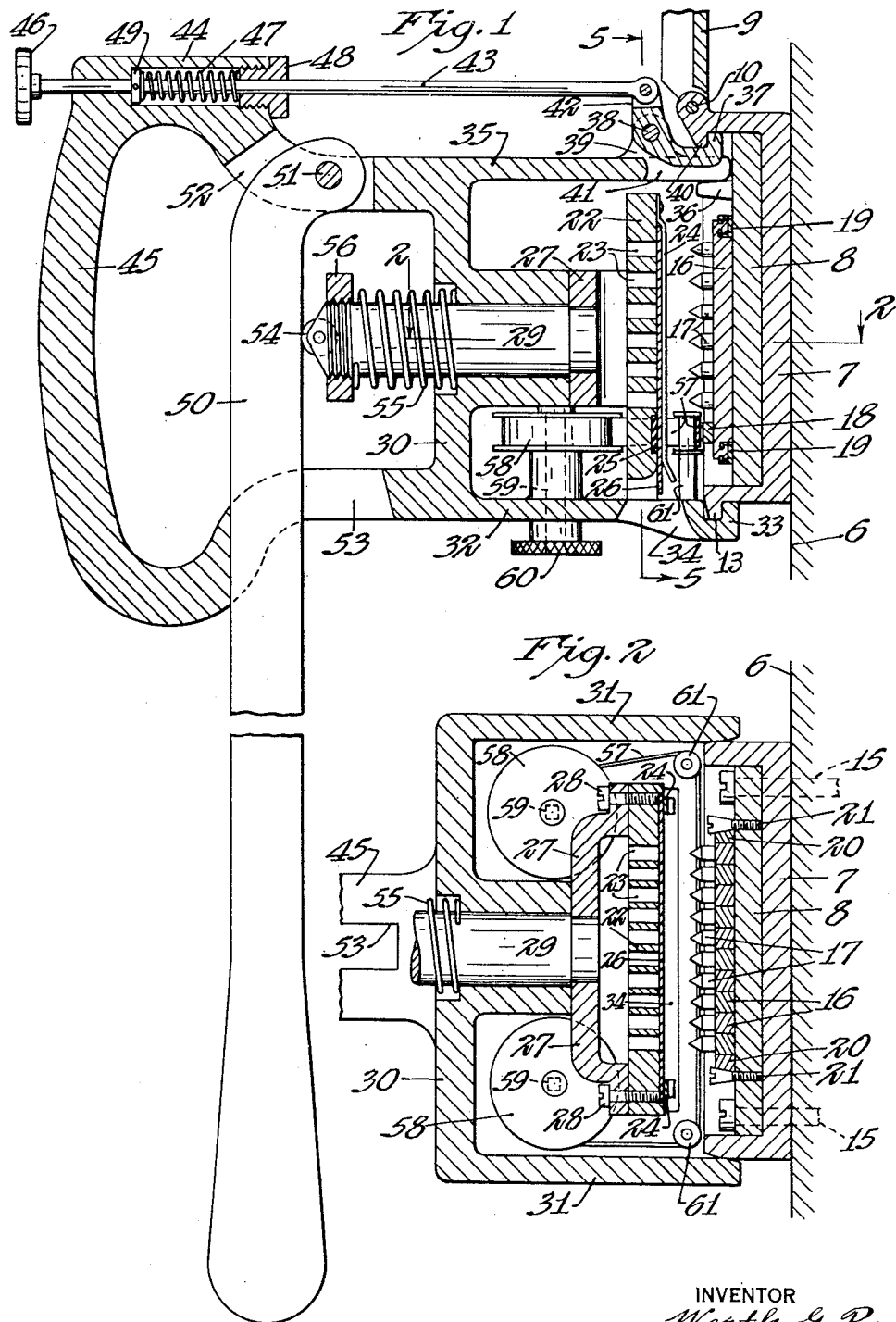
INVENTOR
Worth G. Read
BY John E. Stryker, Jr.
ATTORNEY

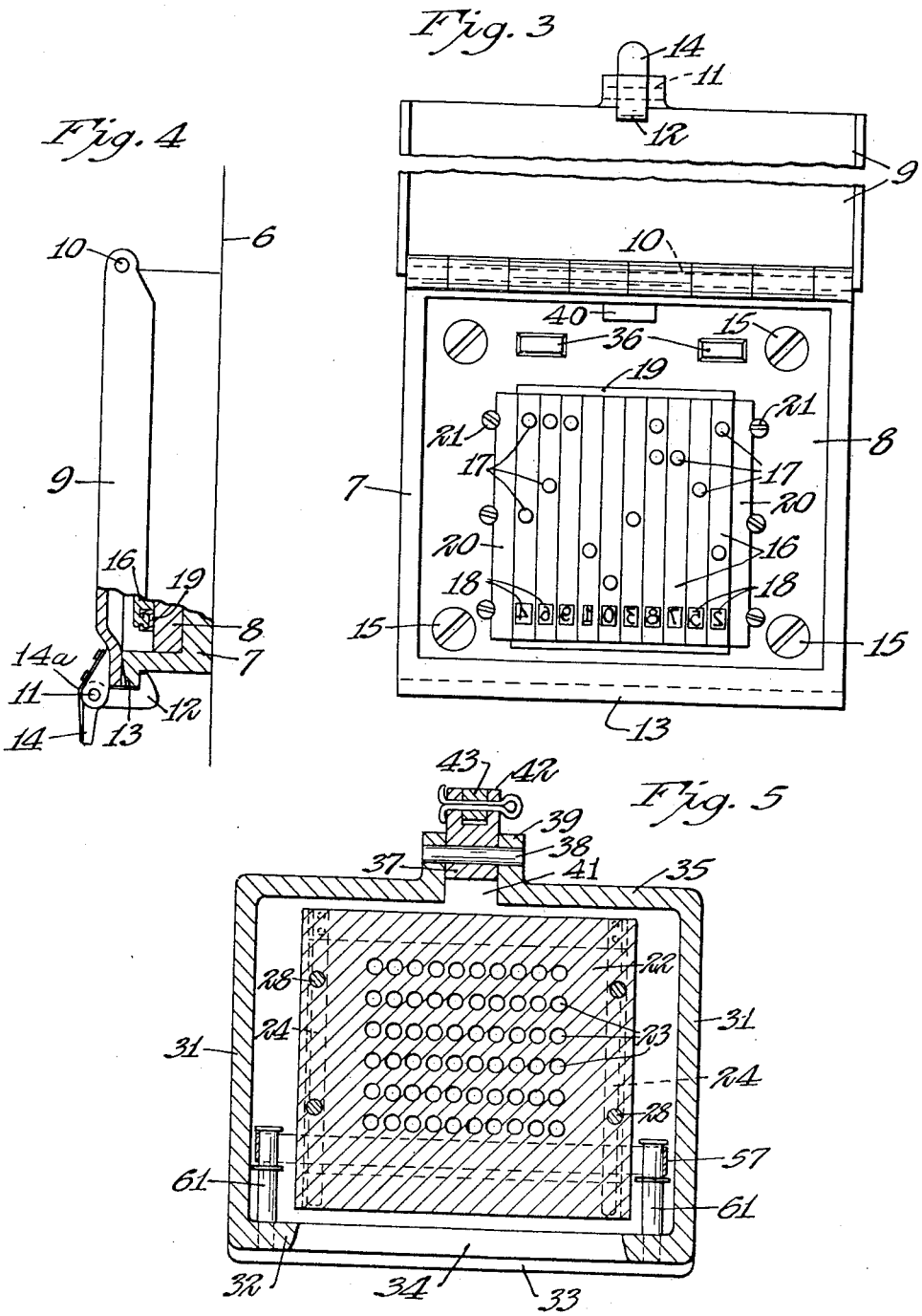

Patented Feb. 28, 1950

2,498,896

UNITED STATES PATENT OFFICE 2,498,896

APPARATUS FOR IDENTIFYING MOBILE EQUIPMENT

Worth G. Read, St. Paul, Minn.

Application April 3, 1944, Serial No. 529,263

2 Claims. (Cl. 164—111)

Railroads have experienced serious loss of revenue as the result of the difficulties attendant upon keeping accurate daily records of freight cars and other rolling stock in transit. The principal source of error is the manual transcription of the identifying data which must be taken from the individual cars at various times of the day and night under all weather conditions and wherever the cars may be located. The problem of keeping accurate freight car records is complicated by the fact that the cars are moved from the tracks of one railroad to those of others indiscriminately so that each road must account for a large number of cars owned by other roads and the identifying data includes the names of the car owners, the tonnage capacity of each car and car number which may comprise six or seven digits. In many cases all of this data must be taken from each car at several different stations during a single day. It will thus be evident that the chances for error are great according to present methods involving manual transcription of the data. Somewhat similar problems exist with reference to other mobile equipment, such as that owned by various government agencies and departments and certain large private corporations operating trucks, busses and air borne vehicles.

It is an object of this invention to eliminate the principal source of error in keeping records of such equipment by providing each car or other unit with a permanently attached, compact and readily accessible identification plate adapted to coact with suitable recording mechanism carried by the car checkers whereby the identifying data may be quickly and accurately reproduced on a card or record sheet.

Other objects will appear and be more fully pointed out in the following specification and claims.

Referring to the drawings:

Figure 1 is a central vertical section showing my recording mechanism in operative relation to an identifying plate and the housing therefor on a unit of mobile equipment or the like;

Fig. 2 is a fragmentary horizontal section taken on the line 2—2 of Fig. 1;

Fig. 3 is a front elevational view of one of my identifying plates with the housing cover in open position;

Fig. 4 is a part side elevational view and part vertical section showing one of my identifying plate housings with the cover in closed position, and Fig. 5 is a vertical section taken on the line 5—5 of Fig. 1.

In the drawings the numeral 6 indicates the wall of a railway car or other unit of equipment upon which is mounted a housing 7 for an identification plate 8. The housing has short, rectangularly disposed sides projecting from the wall 6 and a cover 9 connected by a hinge pin 10 to the upper side of the housing. Mounted on the free edge of the cover 9 is a latch pivoted on a pin 11 and formed with a dog 12 for engagement with a flange 13 formed on the housing 7. A manually operable finger 14 is provided to actuate the dog 12 which is normally held in locking position by a leaf spring 14a.

The housing 7 and plate 8 are adapted to be permanently secured to the wall 6 by bolts 15 or by other suitable means, and the plate 8 is provided with a number of members 16 each having fixed thereon one or more punch pins 17 and an interpretation type character 18. The number and positions of the pins 17 on the members 16 are varied according to a predetermined code to correspond to the several type characters 18. One suitable arrangement of pins relative to the ten numerals, according to a common punch card code, is indicated in Fig. 3 of the drawing. The members 16 comprise parallel bars of equal length formed to interlock with channel shaped bars 19 (Figs. 1 and 4) which extend crossways of the members 16 and are rigidly fastened to the plate 8. To confine the group of members 16 at opposite sides, follower bars 20 are provided and are, in turn, confined by screws 21 having cone shaped heads for exerting lateral pressure on the group.

My recording apparatus includes a generally rectangular die plate 22 formed with a multiplicity of apertures 23 spaced to receive the punch pins 17 of any of the identification plates. Extending respectively along opposite margins of the working face of the plate 22 is a pair of spring fingers 24 and extending at right angles to the spring fingers is an elastic platen 25 to receive the impression of the type characters 18. A card 26 or other suitable record sheet may be inserted and held on the working face of the die plate 22 by the fingers 24.

As best shown in Fig. 1, the fingers 24 are formed with shoulders near their ends attached to the plate 22. These shoulders afford back gauge means for engagement with the back edge of each of the cards 26. Along its side edges the plate 22 carries projecting members or flanges which act as side gauges for the cards 26, as shown in Fig. 2, these side gauges extending in parallel relation and adjacent to the respective spring fingers 24. The cards 26 are divided into zones severally adapted to receive apertures and are severally placed in engagement with back gauges formed on the fingers 24 and side gauges carried by the plate 22. It will be evident that the projecting gauge members are adapted to hold a card on the plate 22 in predetermined fixed relation to any of the plates 8 to which the punching head may be applied, whereby the several zones on the cards may be caused to register with corresponding punch or cutting members carried by any plate 8.

To support the die plate 22 it is fastened to a rigid bracket 27 by bolts 28 and the center portion of this bracket is rigidly connected to a plunger 29, the bracket plunger being spaced from the perforated area of the plate 22 to permit the escape of punchings or card particles from the apertures 23. The plunger 29 is slidable in a bearing formed in a housing indicated generally by the numeral 30. This housing has side walls 31 adapted to fit outside of the housing 7, as indicated in Fig. 2, and the normally lower wall 32 of the housing 30 is formed with a hook-like extension 33 adapted to receive and fit the flange 13 of the housing 7. An elongated slot 34 is formed in the wall 32 in position to permit the insertion and withdrawal of the cards 26 relative to the platen face of the die plate 22. A normally upper wall 35 of the housing 30 is adapted to extend inside of the housing 7 to engage the upper surfaces of a pair of cam lugs 36 projecting from the plate 8, as indicated in Fig. 1.

To hold my recording mechanism in operative relation to the plate 8, I provide latch mechanism which includes a dog 37 connected by a pivot pin 38 to a pair of ears 39 formed on the wall 35 and this dog is aranged to interlock with a lug 40 formed on the upper portion of the housing 7 and to be retracted into an opening 41 formed in the wall 35. Integral with the dog 37 and projecting outward from the ears 39 is a pair of fingers 42 connected to a rod 43. This rod is spring biased to tend to retain the dog 37 in engagement with the lug 40 and is guided in a bearing 44 formed near the upper extremity of a handle 45 for carrying the recording mechanism. An end of the rod 43 projects from the bearing 44 and is fitted with a head 46 to be actuated by the thumb of the operator's hand grasping the handle 45. Within a recess formed in the bearing 44 is mounted a helical spring 47 which is confined at one end by a nut 48 threaded in the bearing and at its other end by a collar 49 which is fixed on the rod 43.

A lever 50 extends across the outer end of the plunger 29 to be manipulated for actuating the recording mechanism. A pin 51 connects the normally upper end of the lever 50 to the handle 45 and slots 52 and 53 are formed in the handle to receive and guide the lever 50 in engagement with a small anti-friction roller 54 mounted on the plunger 29. Confined on the plunger is a helical spring 55 bearing at one end on the housing 30 and at its other on a nut 56 threaded on the outer end portion of the plunger. It will be evident that the spring 55 normally actuates the plunger 29 to retract the die plate 22 to a position where its working face is accessible for the insertion of the cards 26 through the openings 24.

Ink is supplied for printing the impressions of the type characters 18 by a ribbon 57 adapted to be wound on either of a pair of spools 58 which are mounted on the housing wall 32. Axially disposed spindles 59 extend from the spools 58 through bearings on the wall 32 and are fitted with knobs 60 at the outer face of said wall to permit manual winding of the ribbon 57 to either spool. In passing from one spool to the other, the ribbon is guided on a pair of pins 61 which are mounted respectively at opposite sides of the housing. These pins guide the ribbon so that it is retained in registry with the line of type characters 18 and between them and the elastic platen 25.

In carrying out my invention, the several cars or other mobile units will be provided with identification plates having different combinations of punch pins and lines of interpretation. Preparatory to making a record of a unit, an operator equipped with my recording mechanism merely inserts a card 26 through the slot 34 to proper position on the die plate 22 where the card is held by the spring fingers 24 in predetermined, fixed position, as determined by the projecting side and back gauge members. To reproduce a particular combination of identifying characters on the card, the cover 9 of the housing 8 for the associated identification plate is first moved to open position and the recording mechanism is attached to the housing 7 by placing the hook-shaped member 33 in engagement with the flange 13 and pressing the upper wall 35 into engagement with the cam lugs 36 while actuating the dog 37 to engage the lug 40. This places the apertures 23 of the die plate 22 in registry with the punch pins 17 wherever they may be located on the particular identification plate and aligns the ribbon 57 with the line of interpretation characters 18. Now, with the card 26 in place on the die plate 22, the lever 50 is actuated to move the plunger 29 carrying the plate 22 toward the identification plate and to force the punch pins 17 through the card while taking an impression of the characters 18 on the card through the inking ribbon 57. The recording mechanism is then detached from the identification plate housing after merely pressing the head 46 to actuate the rod 43 and withdraw the dog 37 from the lug 40. The card 26 bearing the identification record is finally withdrawn through the slot 34 and is replaced by a blank card for the next record.

It will be evident that the operation above described may be repeated quickly and easily to obtain records of all of the cars at a particular station or yard. Selected members 16 with their punch pins and interpretation characters may be used to indicate the name of the car owner and others to indicate the tonnage, car number and other data that may be required. The characters identifying the particular station or yard where the record is to be made as well as the date and hour of the record may also be placed on the cards. When completed such cards are collected and used by the auditing department of the organization in making other records and computations with the assurance that there are no errors in these original records. The punched cards may be sorted and classified rapidly and accurately by the use of punch card sorting machines of conventional or suitable types.

Having described my invention, what I claim as new and desire to protect by Letters Patent is:

1. In apparatus for making original punch card records identifying separate units on similar cards divided into zones severally adapted to receive apertures, plates adapted to be fastened to the respective units, each plate carrying a group of card cutting members differing in their relative positions on the plate from those of the other plates, a separate punching head adapted to be moved to the several plates and having complementary die members adapted to coact with the card cutting members of any of said plates to cut groups of apertures in cards corresponding in sizes and shape and in their relative positions on the cards to the groups of cutting members on the plates respectively, said head having a plane face for supporting the several cards and means projecting from said face for holding a card in predetermined fixed relation to any plate to which the punching head is applied whereby the several zones on the cards may be caused to register with the several cutting members on any plate.

2. In apparatus for making original punch card records identifying separate units on similar cards divided into zones severally adapted to receive apertures, plates fastened to the respective units, each plate having a group of cutting members of similar shape projecting therefrom for identifying by their relative locations on the plate the particular unit to which they are fastened, a punching head adapted to be applied to any of said plates and having a platen formed with a multiplicity of apertures disposed to receive the cutting members of any of said groups and to cut groups of perforations in cards corresponding in their relative positions on the cards to the groups of cutting members on the plates respectively and means projecting from the face of said platen for holding a card in predetermined fixed relation to any of said plates to which the punching head is applied whereby the several zones on the cards may be caused to register with the several cutting members on any plate.

WORTH G. READ.

REFERENCES CITED

The following references are of record in the file of this patent:

UNITED STATES PATENTS

| Number | Name | Date |
| --- | --- | --- |
| 893,686 | Wille | July 21, 1908 |
| 1,795,480 | Dugdale | Mar. 10, 1931 |
| 1,928,685 | Dugdale | Oct. 3, 1933 |
| 2,039,072 | Dugdale | Apr. 28, 1936 |
| 2,134,815 | Elliott | Nov. 1, 1938 |
| 2,193,064 | Elliott | Mar. 12, 1940 |
| 2,213,490 | Elliott | Sept. 3, 1940 |
| 2,278,288 | Sadler | Mar. 31, 1942 |

FOREIGN PATENTS

| Number | Country | Date |
| --- | --- | --- |
| 151,702 | Switzerland | Mar. 16, 1932 |
| 344,227 | Germany | June 10, 1922 |